June 25, 1946.     J. A. TAYLOR ET AL     2,402,695
BATTERY OVERCHARGE PROTECTOR
Filed Oct. 16, 1944
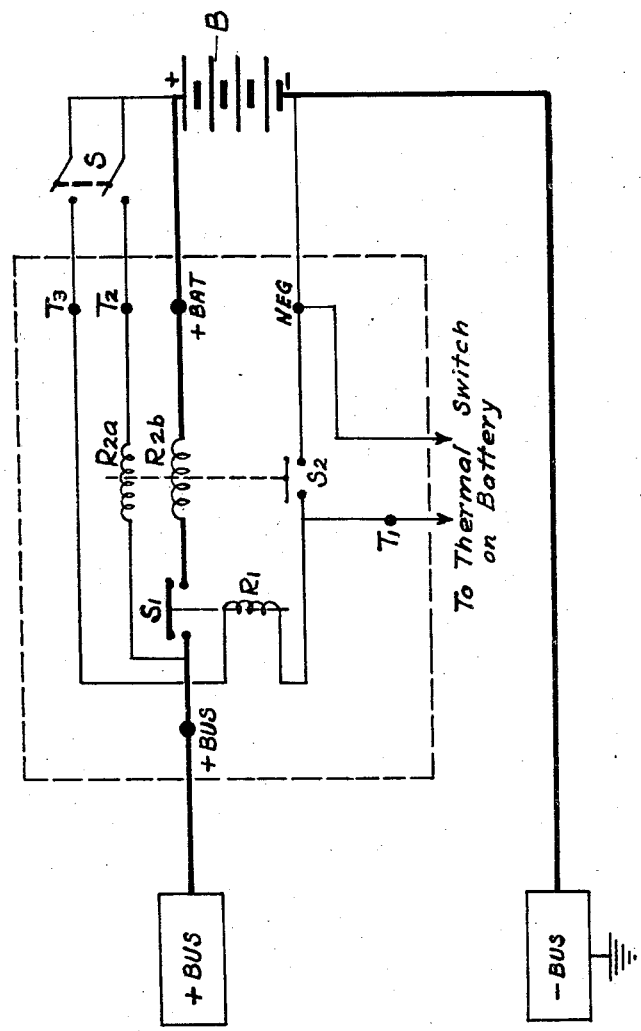
John A. Taylor
Milton A. Knight
INVENTORS
BY
ATTORNEY Patented June 25, 1946

2,402,695

UNITED STATES PATENT OFFICE 2,402,695

BATTERY OVERCHARGE PROTECTOR

John A. Taylor, Washington, D. C., and Milton A. Knight, Arlington, Va.

Application October 16, 1944, Serial No. 558,900

5 Claims. (Cl. 320—36)

(Granted under the act of March 3, 1883, as amended April 30, 1928; 370 O. G. 757)

This invention relates in general to battery charging circuits, and more particularly to a battery charging circuit that will prevent damage to the battery from an excessive rise in temperature.

In direct current generator-battery systems as are employed for aircraft and other installations, the generator voltage as well as the temperature of the storage battery affect the rate at which the storage battery is charged by the generator. Usually the generator voltage is adjusted to provide normal charging current for the battery under existing conditions. However, if the generator voltage increases or if the battery temperature increases above the safe value, excessive charging of the battery will take place. By excessive charging it is meant that more current than actually needed to charge the battery passes through the battery and generates heat in the battery. As the temperature of the battery increases from this heating effect or from an increase in ambient temperature, the counter electromotive force or internal resistance decreases and the charging rate will rapidly increase even though the charging voltage is maintained constant.

Under normal conditions an uncharged battery may be charged at high currents with negligible temperature rise until the battery approaches a fully charged condition. When fully charged the high charging current will further increase battery heating which results in increased charging current and finally a temperature is reached which results in severe damage to the battery. Thus it is desirable to limit the battery charging current when the safe battery temperature is exceeded.

In direct current generator-battery systems employing common bus-bars such as are used in aircraft and other installations, it is desirable that there be a minimum resistance between the battery and the bus when the battery is capable of delivering current to the bus, and that the charging current from the bus to the battery be limited when the safe temperature of the battery is exceeded. The reasons for limiting battery charging current have been pointed out in the preceding paragraphs. A need for having negligible resistance between the battery and the bus on discharge arises when a heavy electrical load is connected to the bus so that the outputs of both battery and generator are required.

It is also desirable to have the generator voltage sufficiently higher than the battery voltage in order to be sure of fully charging the battery for use when the load requires it and to allow adequate difference in voltage for operating the reverse current cut out.

The battery charging circuit of this invention prevents damage to the battery from excessive temperature when charging and permits discharge under all conditions of temperature. It is accomplished by utilizing applicants' discovery of a particular arrangement of a polarized or directional relay and a thermal switch which functions when the battery switch is closed.

It is an object of this invention to provide a system to automatically prevent high battery charging current by opening the battery switch when the battery temperature is above a predetermined safe value for high charging currents.

Another object is to provide a system that automatically connects the battery to the bus through the battery switch when the battery is required to deliver current to the bus regardless of battery temperature.

Another object is to provide a system to maintain the battery switch closed when the battery is delivering current to the bus although the safe temperature for battery charging is exceeded.

Another object is the provision of a device which will be economical to manufacture, reliable in operation and which possesses all of the qualities of ruggedness and dependability in service.

The single figure is a circuit diagram illustrating this invention.

For the purpose of description it is understood that a generator positive terminal is connected to the positive bus and the generator negative terminal is connected to the negative bus.

The thermal switch is mounted in or on the battery and it is so designed that the thermal switch contacts are normally closed when the battery temperature is below a certain predetermined value. The contacts of the thermal switch automatically open when the battery temperature exceeds the predetermined value and automatically reclose when the battery temperature drops below this predetermined value.

The polarized relay is so designed that current flowing from the battery to the bus through coil $R_{2a}$ will close relay contacts $S_2$ and tend to maintain these contacts closed. Similarly, current flowing from the battery to the bus through coil $R_{2b}$ will close relay contacts $S_2$ and tend to maintain these contacts closed. Current flowing from the bus to the battery through coils $R_{2a}$ and/or $R_{2b}$ will open contacts $S_2$ and tend to maintain these contacts open.

The operation of the thermal switch and polarized or directional relay is such that when the battery temperature exceeds the safe value for charging, the thermal switch opens the circuit between battery and bus at contacts not shown but which are in parallel circuit relation to contacts $S_2$. When the contacts of the thermal switch are open, the opening and closing of the battery contactor contacts $S_1$ is controlled by the polarized or directional relay so that battery charging current is limited by the resistance of coil $R_{2a}$, but it will connect the battery to the bus by means of the battery contactor regardless of the thermal switch when the battery voltage is above the bus voltage, and it will maintain the battery contactor closed when the battery is supplying current to the bus.

To discuss the operation of the circuit, assume the aircraft is at rest and has been placed in stand by condition. The generator is not operating and it is consequently disconnected from the bus. The battery is disconnected from the bus because double throw single pole switch S is open and the deenergized position of the contacts $S_1$ of battery contactor $R_1$ is open-circuited. The temperature of the battery is ambient plane temperature and the contacts of the thermal switch thereon and not illustrated are normally closed.

A mechanic arrives to condition the aircraft for use and closes double pole single throw switch S. The closing of switch S places the terminals of the battery across high resistance coil $R_{2a}$ of directional relay, which operates to close contacts $S_2$ as long as there is a predetermined potential differential between the battery and the bus, so that battery current is flowing to the bus or in other words, the battery is discharging. The closing of relay contacts $S_2$ places coil $R_1$ of the battery contactor across the terminals of the battery which operates to close contacts $S_1$ connecting the battery to the bus through low resistance coil $R_{2b}$ of the directional relay. The protective circuit has now operated to connect the battery to the bus to supply any load that may be placed on it.

Suppose a large load is thrown on the bus before the generator is in operation, a load that is equivalent to a short-circuit. The only resistance in the battery circuit is $R_{2b}$ which, for practical purposes, may be considered negligible. The battery can discharge to exhaustion, and the temperature rise to the point where the contacts of the thermal switch have opened, but the battery will still remain connected to the bus because polarized or directional relay contacts $S_2$ effectively short-circuit the thermal switch contacts on battery discharge. It is evident then, that under all conditions the battery remains connected to the bus on discharge.

If the generator is operating and connected to the bus, its voltage will be set at such a value as to completely charge the battery. When the battery is charging the current through the directionall relay coils $R_{2a}$ and $R_{2b}$ has reversed and opened contacts $S_2$, which places the normally closed contacts of the thermal switch in series in the circuit with coil $R_1$ of the battery contactor, thus controlling the operation of the battery contactor by the thermal switch. The battery contactor contacts $S_1$ do not operate upon reversal of current in the battery circuit because its coil $R_1$ is so connected that the current through it is always in the same direction regardless of whether the battery is charging or discharging. Now, should the temperature of the battery rise upon charge to a value in excess of that set for the operation of the thermal switch, the contacts of the thermal switch which now control the circuit of the battery contactor will open and deenergize the battery contactor, allowing contacts $S_1$ to open, thus disconnecting the battery from the bus. It is evident that with applicants' protective circuit in use the battery cannot be damaged by excessive temperature on charge for any reason.

The invention described herein may be manufactured and used by or for the Government of the United States of America for governmental purposes without the payment of any royalties thereon or therefor.

What is claimed is:

1. A system for protecting a battery from an excessive rise in temperature on overcharge comprising, a battery whose terminals are connected to the bus-bars, a directional relay having its current coil in series with the positive battery connection, a battery contactor having its contacts in series with the current coil of the relay, and a thermal switch for opening the contacts of the battery contactor when the temperature of the battery exceeds a predetermined value on charging.

2. A system for protecting a battery from an excessive rise in temperature on overcharge comprising, a thermal switch adjacent said battery, directional relay means for rendering the thermal switch inoperative on discharge, automatic switching means for opening the battery circuit on charge in response to the operation of the thermal switch.

3. In a protective device for a battery comprising, means for opening the battery circuit during charging when the temperature of the battery has reached a predetermined value and means for rendering inoperative said temperature responsive means when discharging said battery.

4. In a protective device for a battery that is charged and discharged from the same bus-bars comprising, a directional relay having a current coil in the battery circuit and a potential coil connected between the bus and the battery, the contacts of said relay being connected to short-circuit a thermal switch adjacent said battery, a battery contactor having its contacts connected in the battery circuit and its operating coil across the battery but in series with the contacts of the directional relay and the thermal switch connected in parallel.

5. The method of protecting a battery from excessive temperature on charge when said battery is charged and discharged from the same bus-bars comprising, maintaining said battery connection to the bus on discharge, rendering inoperative the thermal control of the connections on discharge and arming said thermal control on charge for disconnecting said battery from the bus if the battery temperature exceeds a predetermined value.

JOHN A. TAYLOR.
MILTON A. KNIGHT.